United States Patent [19]

Carlyon, Jr.

[11] 4,006,559

[45] Feb. 8, 1977

[54] SELF-IRRIGATING DISPLAY RACK FOR POTTED PLANTS

[76] Inventor: Richard A. Carlyon, Jr., 1000 Sharrow Way, Carson City, Nev. 89701

[22] Filed: Sept. 15, 1975

[21] Appl. No.: 613,079

[52] U.S. Cl. .................................... 47/39; 47/59; 47/16; 47/82; 137/575; 211/131; 239/20; 239/22

[51] Int. Cl.² ................. A01G 27/00; A47G 7/02

[58] Field of Search ............. 47/38, 34.12, 39, 1.2, 47/16, 14; 239/16, 17, 18, 20, 22, 23; 211/127, 129, 131; 137/575

[56] References Cited

UNITED STATES PATENTS

| 283,840 | 8/1883 | Westphal | 47/39 |
|---|---|---|---|
| 764,307 | 7/1904 | Scahill | 47/39 |
| 1,939,803 | 12/1933 | Cataldi | 239/17 |
| 2,896,374 | 7/1959 | Perin | 47/1.2 |
| 3,286,927 | 11/1966 | Zysk | 239/23 |
| 3,435,959 | 4/1969 | Berman, et al. | 211/131 X |
| 3,452,475 | 7/1969 | Johnson, Sr. | 47/34.12 |
| 3,772,827 | 11/1973 | Ware | 47/1.2 X |
| 3,841,023 | 10/1974 | Carlyon, Jr. | 34/12 X |

FOREIGN PATENTS OR APPLICATIONS

| 144,061 | 12/1935 | Austria | 47/39 |
|---|---|---|---|
| 4,051 | 1878 | Germany | 239/22 |
| 1,031,564 | 6/1958 | Germany | 47/1.2 |
| 1,038,329 | 9/1958 | Germany | 239/16 |
| 488,239 | 12/1953 | Italy | 47/1.2 |
| 15,082 | 7/1901 | United Kingdom | 47/34.12 |

Primary Examiner—Edgar S. Burr
Assistant Examiner—Steven A. Bratlie
Attorney, Agent, or Firm—Keith D. Beecher

[57] ABSTRACT

A self-irrigating display rack is provided for potted plants, which comprises a tier of display dishes supported on a reservoir base. The display dishes are mounted in vertically spaced coaxial positions on an upright central tubular member which, in turn, is supported on the base. A pipeline extends upwardly through the interior of the tubular member from the lower end to the upper end thereof coaxially with the tubular member. A pump is mounted in the reservoir base for circulating irrigating water from the reservoir up through the pipeline to the top of the central tubular member. The water from the pipeline is returned to the reservoir through the tubular member. The tubular member is provided with a first set of openings located over each of the dishes, and with a second set of openings located at a predetermined level in each dish. An annular plug is provided in the tubular member coaxially with the pipeline and axially located between each set of openings to divert the water in the tubular member out through the first set of openings to the corresponding dish, the water being returned to the interior of the tubular member through a second set of openings after it has achieved a predetermined level in each of the dishes. A third set of openings is also provided in the tubular member at the bottom of each dish to serve as a drain for the dishes at the end of the irrigation cycle. The size of the third set of openings is small compared with the sizes of the first and second sets of openings.

5 Claims, 7 Drawing Figures

SELF-IRRIGATING DISPLAY RACK FOR POTTED PLANTS

BAKGROUND OF THE INVENTION

The self-irrigating display rack of the present invention is of the same general type as the display rack described in U.S. Pat. No. 3,841,023 which issued Oct. 15, 1974 to the present inventor. The present rack, however, is simpler in its construction.

As is the case with the rack described in the aforesaid patent, the self-irrigating rack of the present invention, likewise, provides an attractive marketing display for small potted plants. The present display rack is likewise intended to be used is supermarkets or other retail outlets, and it serves to overcome problems usually encountered in the marketing and sale of potted plants. For example, the display rack of the invention, like the display rack of the patent, is controlled to irrigate the displayed plants from the bottom up at appropriate intervals, preferably after business hours, without any spashing of mud out of the individual pots as is the case with the usual prior art top watering methods. The irrigation intervals may be automatically timed so that the plants in the display rack are thoroughly watered after business hours, but also have sufficient time to drain, so that subsequent handling by the customers does not occur during or immediately after the irrigation process.

The self-irrigating rack of the present invention has certain advantages, in that it is relatively inexpensive to manufacture. Also, the display rack of the invention is constructed so that the dishes may be rotated about the axis of the central pipeline for easy access to all the plants displayed in the various dishes. Also, the subassembly comprising the pipeline, the tubular member and the supported display dishes can be easily removed from the reservoir base to facilitate cleaning of the display dishes and of the reservoir within the base.

DETAILED DESCRIPTION OF THE ILLUSTRATED EMBODIMENT

Figure 1:
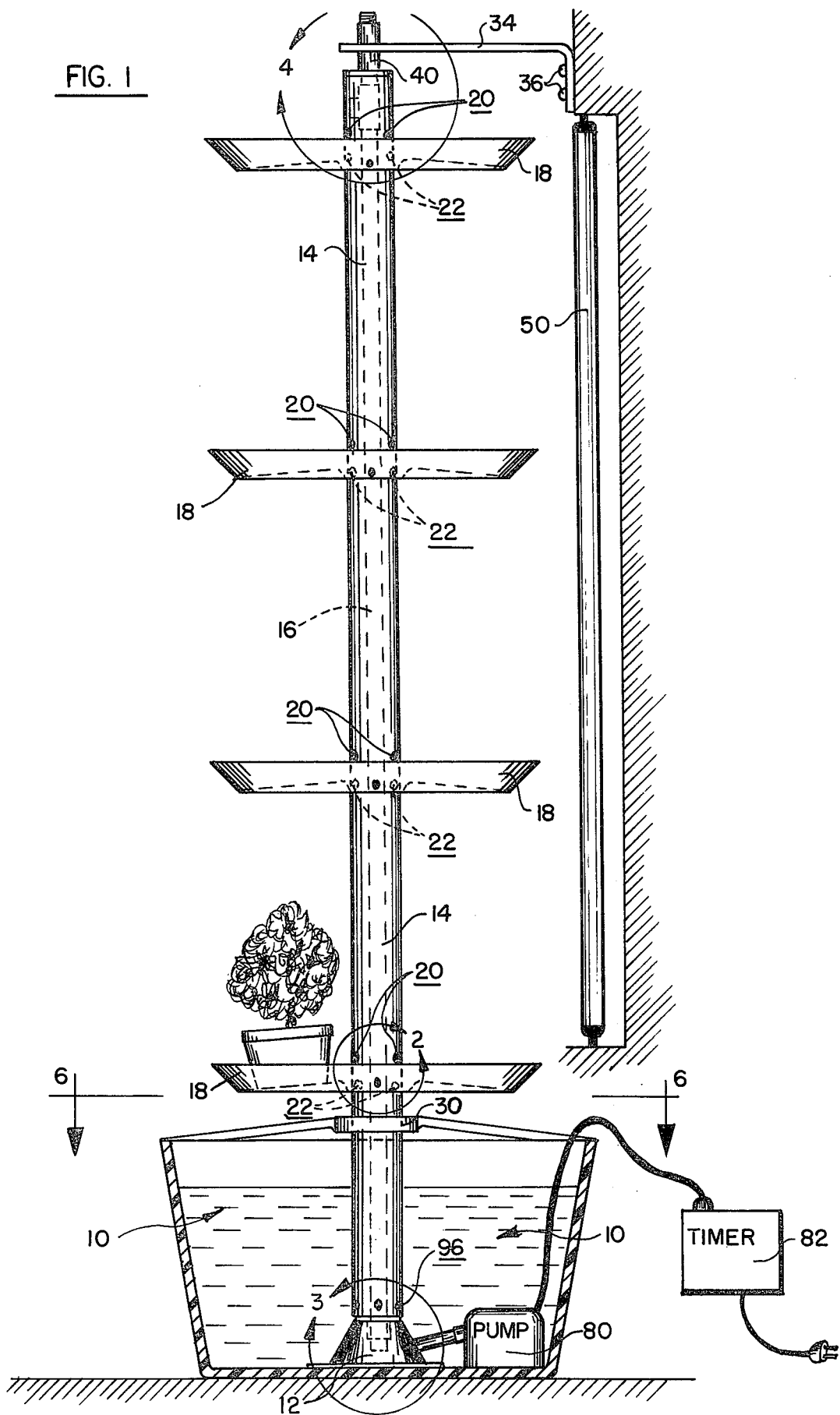
FIG. 1 is a side elevation of a display rack constructed in accordance with one embodiment of the invention.

The assemnbly shown in FIG. 1 includes a bucketlike base 10 which forms a reservoir containing irrigating water. A pipe coupling unit 12 is mounted in the base 10, and unit 12 supports an enlongated upright tubular member 14 and a pipeline 16 which extends coaxially upwardly through the tubular member 14.

The pipeline 16 for example, may be a quarter inch steel pipe, or it may be formed of any other appropriate material, and have any other appropriate diameter. The tubular member 14 may be PVC plastic, or it may be formed of any other appropriate material.

Figure 2:
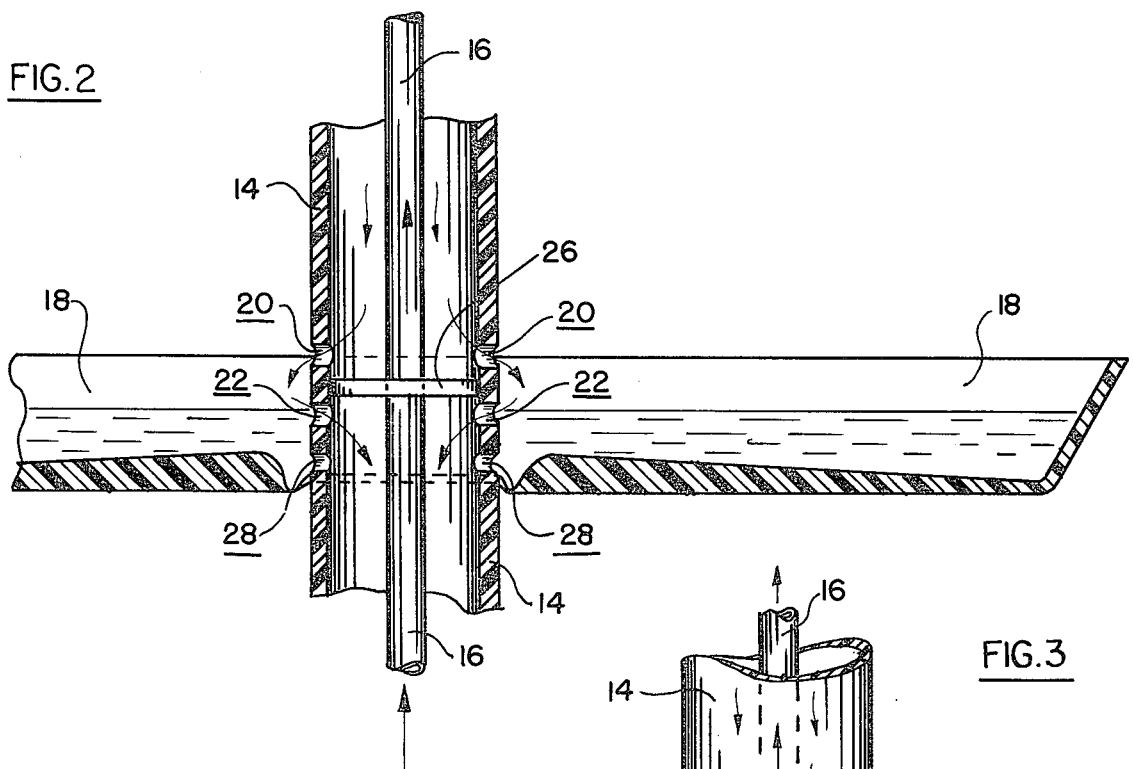
FIG. 2 is a more detailed enlarged sectional representation of the portion of the rack within the area designated 2—2 in FIG. 1.

A plurality of dishes 18 are supported on the tubular member 14 in spaced, tiered, horizontal positions. The tubular member 14 has a first set of openings 20 located over each dish 18, and a second set of openings 22 located over each dish 18 at a predetermined level up from the bottom of each dish. As best shown in FIG. 2, an annular plug 26 is mounted on the pipeline 16 between the openings 20 and 22 to divert water in the tubular member 14 out through the openings 20 and into the dishes 18. When the water in the individual dishes reaches a predetermined level, it flows back into the interior of the tubular member 14 through the openings 22.

A further set of openings 28 are provided in the tubular member 14 at the bottom of each of the dishes 18, which serve as drainage openings to drain the water out of the individual dishes at the end of the irrigation cycle. The size of the openings 28 is smaller than the size of either the openings 20 or openings 22.

Figure 4:
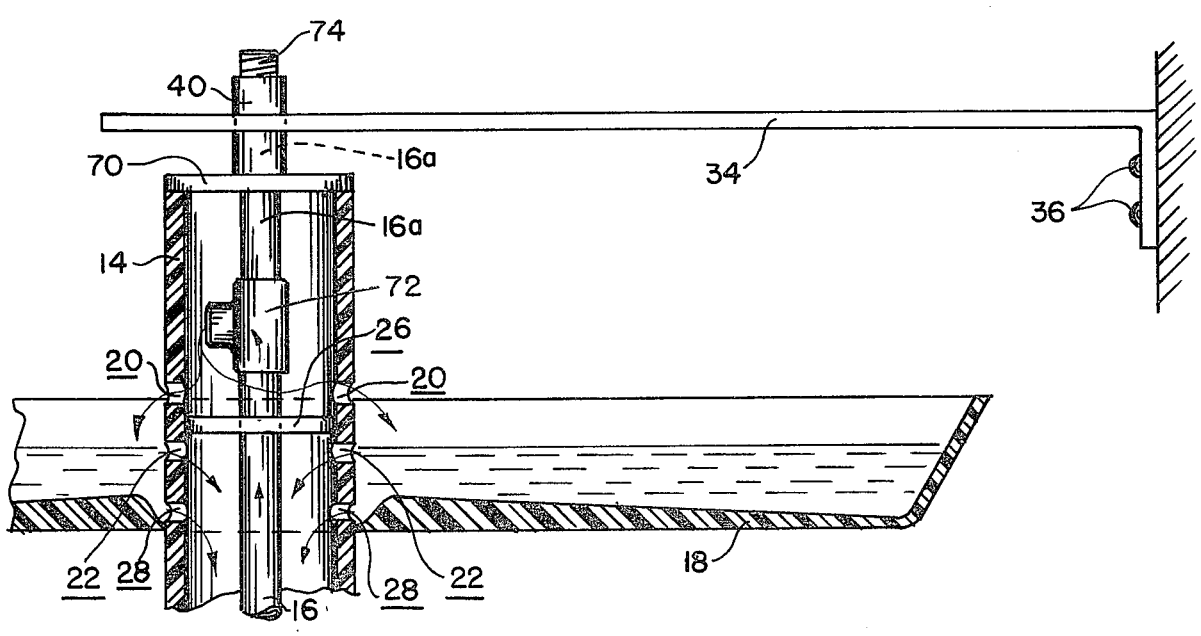
FIG. 4 is an enlarged sectional representation of the upper end of the assembly within the area designated 4—4 in FIG. 1.
Figure 6:
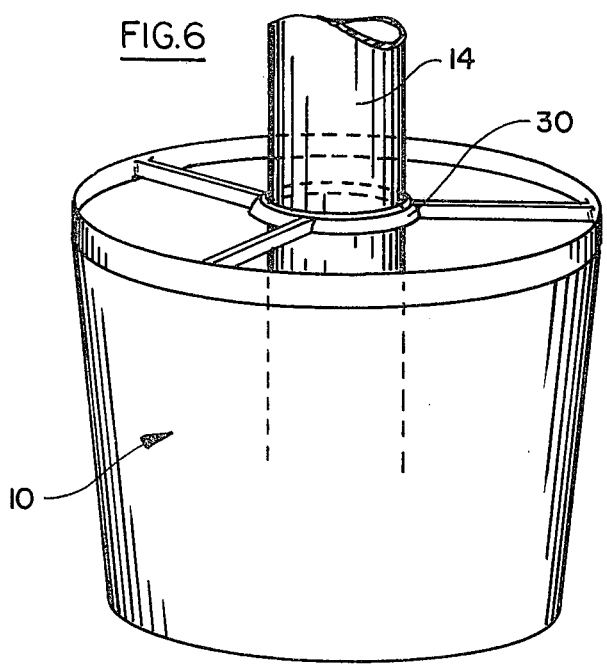
FIG. 6 is a top perspective view of the reservoir and base taken essentially along the line 6—6 of FIG. 1.
Figure 7:
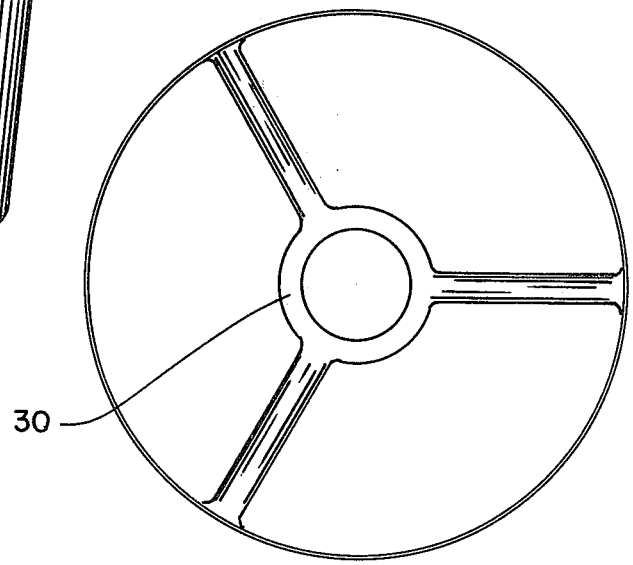
FIG. 7 is a top plan view of the reservoir and base.

The tubular member 14 is supported by means of a spiderlike bracket 30 mounted at the top of the base 10, as best shown in FIGS. 6 and 7. The upper end of the pipeline 16 is supported by means of a bracket 34 which, in turn, is secured to an adjacent wall, for example, by screws 36. As best shown in FIG. 4, a coupling 40 is provided at the upper end of the pipeline 16 which is mounted in the bracket 34, and which permits the pipeline to turn as the dishes and tubular member 14 are turned by customers to examine the various plants displayed by the dishes 18. When the coupling 40 is tightened, the pipeline 16 also serves as a tensioning element to hold the entire assembly in a rigid condition.

Figure 5:
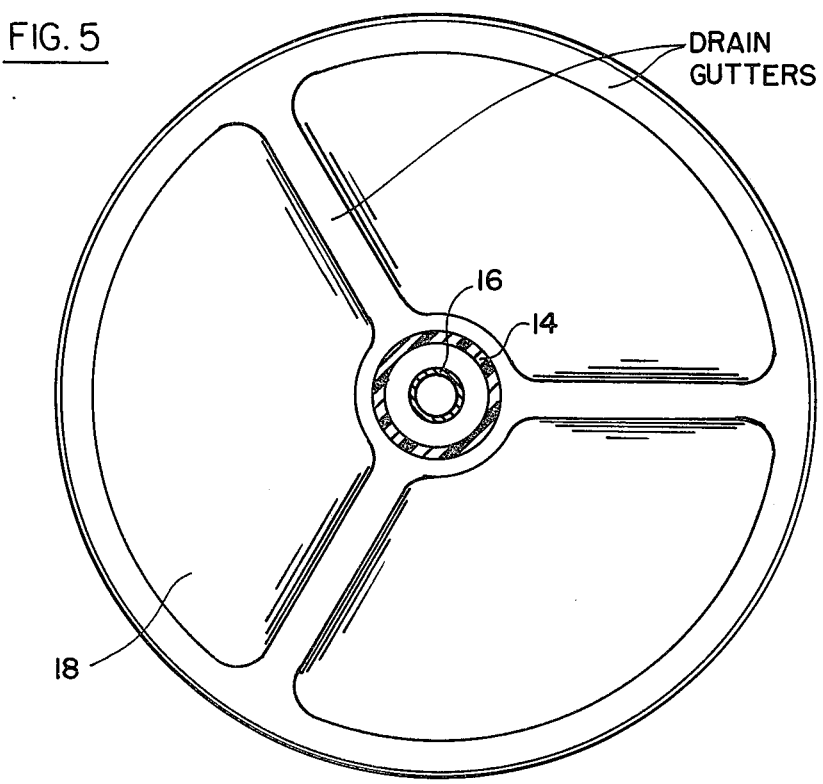
FIG. 5 is a top plan view of one of the display dishes of FIG. 1.

As shown in FIGS. 2 and 4, the bottom surface of each of the dishes 18 is tapered outwardly towards its peripheral edge, so that the plants supported thereby are tilted outwardly for easy customer access, and for maximum visual display. As shown in FIG. 5, drain gutters are provided around the periphery of each dish, and extending radially inwardly, to drain back the water in the individual dishes to the drainage openings 28.

A fluorescent tube 50 may be supported in a wall bracket behind the tier of dishes, as shown in FIG. 1, to illuminate the display and to increase growth. Also, if so desired, the display may be mounted in a transparent plastic unit and heated to create a hot house condition. An immersion heater may be mounted in the reservoir to keep the water warm, and evenly heat the interior of the unit.

The individual dishes 18 may be mounted on the tubular member 14 in a frictional fit therewith. As shown in FIG. 4, the upper end of the tubular member may be enclosed by a washer 70 which is held in place by the coupling 40. The upper end of the pipeline 16 may be coupled to a tee 72 which provides an outlet for the water in the pipeline. The upper end of the pipeline may be formed by a nipple 16A which extends from the tee up through the coupling 40, the upper end of which is closed by a plug 74.

Figure 3:
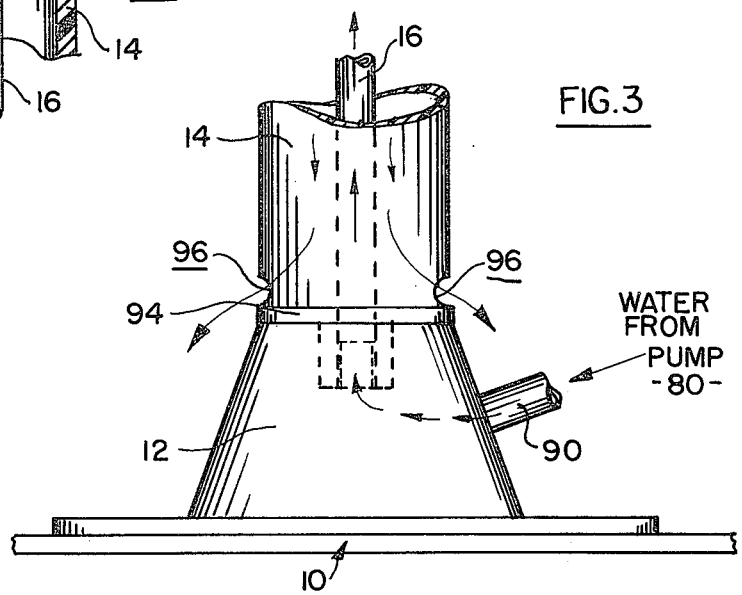
FIG. 3 is a more detailed enlarged representation of a support unit mounted within the reservoir in the base of the assembly, within the area designated 3—3 in FIG. 1.

A pump 80 is mounted within the reservoir in base 10, the pump being electrically activated through a typical timer 82. The outlet of the pump, as best shown in FIG. 3 is coupled to a nipple 90 which is threaded into the unit 12, the unit 12 being bonded to the bottom of the base 10. The pipeline 16 fits into a coupling in the unit 12, to be readily removable. The tubular member 14 is rotatably supported on the unit on, for example, a steel washer 94. A set of openings 96 are provided at the lower end of the tubular member to constitute a return for the irrigating water to the reservoir.

In the operation of the rack, the timer 82 activates the pump 80 at particular times, preferably after business hours, and maintains the pump in an activated condition, sufficiently long to accomplish a complete irrigation of all the plants displayed by the rack. When the pump is activated, it pumps the irrigating water from the reservoir in the base 10 up through the pipeline 16 to the upper end of the pipeline. The water then passes out through the tee 72 in FIG. 4 to the interior of the tubular member 14. Each plug 26 diverts the water out through the openings 20 into the adjacent dish 18.

After the water in the adjacent dish reaches a particular level, it flows back into the interior of the tubular member 14 through the openings 22. The process continues until each of the dishes 18 has water therein to a predetermined level, and the circulation of water continues throughout the irrigating cycle. At the end of the irrigating cycle, the pump is de-activated, and the water in all the dishes 18 gradually drains back into the tubular member 14 through the drainage openings 28 and back to the reservoir in the base 10.

As mentioned above, the sub-assembly comprising the dishes 18, the tubular member 14 and pipeline 16 can be turned by the various customers, to examine the plants supported in the various dishes 18. The assembly itself can readily be disassembled and formed into a compact package for shipping purposes. For cleaning purposes, the sub-assembly can easily be removed from the unit 12 in the base 10, to permit cleaning of the dishes, and of the reservoir itself.

While a particular embodiment of the invention has been shown and described, modifications may be made. It is intended in the claims to cover the modifications which come within the spirit and scope of the invention.

What is claimed is:

1. A display rack for potted plants, and the like, comprising: a bucket-like base forming a reservoir for irrigating water; an elongated upright tubular member supported on said base and extending upwardly therefrom; a plurality of display dishes mounted in a spaced tiered relationship on said tubular member over said reservoir each of said display dishes having a bottom and an open top; a pipeline extending upwardly through said tubular member from the reservoir to the upper end of said tubular member; a pump mounted in the reservoir and having an outlet coupled to the pipeline for pumping irrigating water from the reservoir up through the pipeline; outlet means mounted on said pipeline at the top of said tubular member to direct water out of the pipeline into the interior of the tubular member to be returned to said reservoir through said tubular member; said tubular member having first openings therein directly over each dish supported thereon, and said tubular member further having second openings therein at a predetermined level in each dish supported thereon; and a corresponding plurality of annular plug members mounted within said tubular member coaxially with said pipeline and filling the space between the pipeline and the inner wall of the tubular member, said plug members being respectively interposed between the first and second openings in said tubular member to divert the irrigating water in the tubular member out through the first openings therein and into the display dishes, with the water being returned to the tubular member through the second openings therein after reaching a predetermined level in the individual display dishes so as to cause the display dishes from the top of the display rack down to the bottom thereof to be sequentially filled with irrigating water.

2. The display rack defined in claim 1, in which said tubular member has third openings therein at the bottom of each of the display dishes for drainage purposes, said third openings being relatively small as compared with said first and second openings.

3. The display rack defined in claim 1, and which includes means at the top and bottom of said tubular member for rotatably supporting said tubular member to permit the display dishes and the tubular member to be turned in unison about the longitudinal axis of the pipeline.

4. The display rack defined in claim 3, in which said means at the bottom of said tubular member includes a unit for coupling the outlet of the pump to the lower end of the pipeline, and for rotatably supporting the lower end of the tubular member, with the pipeline and the tubular member being removably supported on said unit.

5. The display rack defined in claim 1, in which said pump is electrically activated, and which includes a timer unit electrically connected to the pump for controlling the times at which the pump is activated.

* * * * *